United States Patent
Brooker et al.

(10) Patent No.: US 11,668,038 B2
(45) Date of Patent: Jun. 6, 2023

(54) METHOD OF LAUNDERING FABRIC

(71) Applicant: The Procter & Gamble Company, Cincinnati, OH (US)

(72) Inventors: Anju Deepali Massey Brooker, Newcastle upon Tyne (GB); Carlos Amador Zamarreno, Newcastle upon Tyne (GB); Laura Bueno Romo, Newcastle upon Tyne (GB); Philip Frank Souter, Morpeth (GB)

(73) Assignee: The Procter & Gamble Company, Cincinnati, OH (US)

( * ) Notice: Subject to any disclaimer, the term of this patent is extended or adjusted under 35 U.S.C. 154(b) by 130 days.

(21) Appl. No.: 17/214,995

(22) Filed: Mar. 29, 2021

(65) Prior Publication Data

US 2021/0310171 A1 Oct. 7, 2021

(30) Foreign Application Priority Data

Apr. 3, 2020 (EP) .................................... 20168011

(51) Int. Cl.
*D06F 33/36* (2020.01)
*D06F 33/46* (2020.01)
*D06F 105/10* (2020.01)
*D06F 103/04* (2020.01)
*D06F 103/06* (2020.01)
*D06F 34/18* (2020.01)
*D06F 105/02* (2020.01)

(52) U.S. Cl.
CPC ............. *D06F 33/36* (2020.02); *D06F 33/46* (2020.02); *D06F 34/18* (2020.02); *D06F 2103/04* (2020.02); *D06F 2103/06* (2020.02); *D06F 2105/02* (2020.02); *D06F 2105/10* (2020.02)

(58) Field of Classification Search
CPC .......... D06F 33/36; D06F 33/37; D06F 33/46; D06F 2105/10
See application file for complete search history.

(56) References Cited

U.S. PATENT DOCUMENTS

| | | | |
|---|---|---|---|
| 4,995,247 A | 2/1991 | Ishino et al. | |
| 2011/0047713 A1 | 3/2011 | Kim et al. | |
| 2016/0060800 A1* | 3/2016 | Ghosh | D06F 33/34 68/12.23 |
| 2018/0245268 A1* | 8/2018 | Jung | D06F 33/34 |

FOREIGN PATENT DOCUMENTS

| | | |
|---|---|---|
| CN | 1683626 A | 10/2005 |
| CN | 102191667 A | 9/2011 |
| CN | 103485119 A | 1/2014 |
| CN | 105088644 A | 11/2015 |
| CN | 105332236 A | 2/2016 |
| EP | 2636727 A1 | 9/2013 |
| KR | 20070073133 A | 7/2007 |
| WO | 02099178 A1 | 12/2002 |
| WO | 2006101362 A1 | 9/2006 |

OTHER PUBLICATIONS

Extended European Search Report for EP20168011.3 dated Sep. 8, 2020, 5 pages.
PCT Search Report and Written Opinion for PCT/US2021/024039 dated Jun. 20, 2021.

* cited by examiner

*Primary Examiner* — Michael E Barr
*Assistant Examiner* — Kevin G Lee

(57) ABSTRACT

A method of laundering fabric including: (a) calculating a final amount of water to be added to a final wash bath; (b) calculating the amount of energy needed to heat this final amount of water to a desired final temperature; (c) contacting an amount of water that is less than the final amount water with fabric to form an intermediate wash bath, wherein a detergent composition is contacted to the fabric during the formation of the intermediate wash bath, or prior to the formation of the intermediate wash bath; (d) heating the water that contacts the fabric during (c) with the energy calculated in (b) such that the intermediate wash bath has a temperature above the desired final temperature; (e) washing the fabric in the intermediate wash bath for at least 3 minutes; (f) contacting the remaining amount of water to the intermediate wash bath to form the final wash bath having the desired final temperature; (g) washing the fabric in the final wash bath for at least 5 minutes; and (h) rinsing the fabric.

14 Claims, No Drawings

METHOD OF LAUNDERING FABRIC

FIELD OF THE INVENTION

The present invention provides a method of laundering fabric. The method improves the efficiency of the laundering process and is particularly useful for laundering processes designed for economical washing cycles.

BACKGROUND OF THE INVENTION

Trends for laundering of fabrics are moving towards short and cold cycles in order to reduce energy usage and deliver improved fabric care. The present invention provides a method of laundering fabric, which improves cleaning performance when compared to existing cycles that use the same water and energy resources. The present invention is especially useful to improve performance in economy wash cycles, i.e. such as those having a wash temperature of 30° C. or lower, where cleaning performance of solid fats soils having a melting point above 30 C and other temperature sensitive soils is hindered.

In the present invention, an intermediate laundering within the main wash subjects the fabric to an initial reduced amount of water, so that the same amount of chemistry and thermal energy dispensed in a standard cycle can be concentrated in this interim washing, resulting in a higher concentration of chemistry and a higher temperature, for example a washing temperature above the melting point of the solid fat soils.

Most washing machines feature an outer tub that contains the water and an inner rotating drum where the fabrics are washed. In order to allow for the rotating drum suspension movement, typically there is a space between the inner rotating drum and the outer tub. Often, washing machines take cold water and there is a water heater placed in the outer tub below the rotating inner drum so that there is no direct contact between the heating element and the fabrics, and typically the first 2-5 kg of water filled will cover the heating element so that heating can start as soon as possible. The space between the outer tub and the bottom of the rotating inner drum is referred to as sump and the mass of water that in that space is referred to as sump water mass. Other washing machines take both cold and hot water inlets and can control temperature via mixing of the two water inlets. A standard washing machine cycle typically follows the steps:

(i) water starts filling the washing machine, first filling the sump water volume and then soaking the fabrics;
(ii) the detergent is either dispensed from a drawer by the filling water or dispensed from a dosing device or soluble unit dose within the inner drum;
(iii) the drum rotates to ensure that fabrics absorb the water added;
(iv) water keeps filling until fabrics are saturated with water and there is some additional free water on top of the water sump mass and the absorbed water on the fabric (this additional free water is often measured via a pressure sensor);
(v) the process of filling can take place in multiple stages: water stops, drum rotates for water to absorb, water fills again and so on until the required free water is measured.

SUMMARY OF THE INVENTION

The present invention provides a method of laundering fabric comprising:

(a) calculating a final amount of water to be added to a final wash bath;
(b) calculating the amount of energy needed to heat this final amount of water to a desired final temperature;
(c) contacting an amount of water that is less than the final amount water with fabric to form an intermediate wash bath, wherein a detergent composition is contacted to the fabric during the formation of the intermediate wash bath, or prior to the formation of the intermediate wash bath;
(d) heating the water that contacts the fabric during (c) with the energy calculated in (b) such that the intermediate wash bath has a temperature above the desired final temperature;
(e) washing the fabric in the intermediate wash bath for at least 3 minutes;
(f) contacting the remaining amount of water to the intermediate wash bath to form the final wash bath having the desired final temperature;
(g) washing the fabric in the final wash bath for at least 5 minutes; and
(h) rinsing the fabric.

DETAILED DESCRIPTION OF THE INVENTION

Method of laundering fabric. The method of laundering fabric comprises:

(a) calculating a final amount of water to be added to a final wash bath;
(b) calculating the amount of energy needed to heat this final amount of water to a desired final temperature;
(c) contacting an amount of water ($m_{Water,Int}$) (m that is less than the final amount of water with fabric to form an intermediate wash bath, wherein a detergent composition is contacted to the fabric during the formation of the intermediate wash bath, or prior to the formation of the intermediate wash bath;
(d) heating the water that contacts the fabric during (c) with the energy calculated in (b) such that the intermediate wash bath has a temperature ($T_{int}$) above the desired final temperature,
(e) washing the fabric in the intermediate wash bath for at least 3 minutes;
(f) contacting the remaining amount of water to the intermediate wash bath to form the final wash bath having the desired final temperature;
(g) washing the fabric in the final wash bath for at least 5 minutes; and
(h) rinsing the fabric.

Preferably, the washing time of (e) to the time of washing time of (g) is in the range of from 1:2 to 1:20.

Preferably, the temperature profile of the method is such that the desired final temperature is 30° C. or less than 30° C., and the temperature of the intermediate wash bath is above 37° C. Typical fats, and their melting points, include: body sebum ($T_{Melting}$=33-36° C.), butter ($T_{Melting}$=32-35° C.), lard ($T_{Melting}$=34-41° C.). The removal of all these fats when operating a standard laundering cycle at a temperature of 30° C. is low. However, above 37° C., most of these fats melt, facilitating the removal process such as via surfactancy and mechanical action.

The method of the present invention is also suitable for the sequential release of chemistry. For example, incompatible chemistries, or chemistries that benefit from high temperature and concentration (e.g. surfactants and kinetic technologies such as enzymes and bleach), can be dosed sequentially, for example one chemistry into the intermediate wash bath and another chemistry into the final wash bath. In this manner, the method of the present invention can allow the formulation of incompatible chemistries into the detergent composition.

One example of a beneficial sequential dosing profile is when bleach is contacted to fabric after (e), such that the intermediate wash bath is free of bleach but the final wash bath comprises bleach. This sequential dosing profile can allow the incorporation of bleach incompatible ingredients into the intermediate wash bath. Such bleach incompatible ingredients can include enzymes.

Typically, the concentration of detergent chemistry present in the intermediate wash bath is higher than the concentration of detergent chemistry present in the final wash bath. However, some detergent ingredients can be dosed later into the method such that they are not present in the intermediate wash bath. In extreme examples of this, the concentration of detergent chemistry present in the intermediate wash bath may be the same as, or even lower than, the concentration of detergent chemistry present in the final wash bath.

Typically, the method is carried out in an automatic washing machine. The water can be heated in the sump of an automatic washing machine, in the water in-let of an automatic washing machine, or externally to the automatic washing machine.

(a) calculating a final amount of water to be added to a final wash bath. (a) calculates the final amount of water to be added to a final wash bath.

Typically, during (a), the weight of fabric to be laundered during the method is determined, and this fabric weight is used when calculating the final amount of water to be added to the final wash bath. Typically, (a) can be calculated by:

$$m_{water,Total}(\text{kg}) = \frac{V_{Drum}(l)}{22} + f \cdot m_{Fabric} \cdot A_{Fabric}$$

wherein $m_{water,Total}$ is the total amount of water estimate for the final fill of the washing machine, $V_{Drum}$ is the volume of the drum in litres, f is the free water factor often set to 1.4, $m_{Fabric}$ is the mass of fabrics and $A_{Fabric}$ is the saturation water content of fabrics per kilo of dry fabrics. $A_{Fabric}$ is set to 2 kg/kg for synthetic fabrics and 2.6 kg/kg for mixed loads.

(b) calculating the amount of energy needed to heat this final amount of water to a desired final temperature. (b) calculates the amount of energy needed to heat this final amount of water to a desired final temperature. Typically, (b) can be calculated by:

$$E = Cp_{water} \cdot m_{water,Total}(T_{Cycle} - T_{Inlet}) + Cp_{water} \cdot m_{Fabric} \cdot (T_{Cycle} - T_{ambient})$$

wherein, $m_{Total}$ is the total final amount of water in kg, $T_{Cycle}$ is the target cycle temperature, $T_{inlet}$ is the temperature of the incoming water, $T_{ambient}$ is the ambient temperature where the washing machine is, $m_{Fabric}$ is the mass of fabrics, $Cp_{Water} = 4186$ J/(kg·K) is the specific heat of water and $Cp_{Fabric}$ is the specific heat of the consider fabrics (1340 J/(kg·K) for cotton; 1275 J/(kg·K) for polyester).

(c) forming the intermediate wash bath. (c) contacts an amount of water $m_{Water,int}$ that is less than the final amount water with fabric to form an intermediate wash bath, wherein a detergent composition is contacted to the fabric during the formation of the intermediate wash bath, or prior to the formation of the intermediate wash bath.

The amount of water is typically controlled to ensure adequate water absorbency of fabric during the intermediate washing. Typically, the amount of water contacted to the fabric in (c) to form the intermediate wash liquor is an amount of water that provides a water content of from 0.5 kg to 3.5 kg of water per kg of fabric.

It may be preferred that the type of fabric to be laundered during the method is determined, and this fabric type is considered when determining the amount of water to be contacted to the fabric in (c). In this manner, it might be preferred to form the intermediate wash such that: (a) when the fabric type is predominantly cotton, the water content is between 0.7 kg and 3.5 kg of water per kilo of fabric, preferably between 1 kg and 3 kg of water per kilo of fabric, most preferably between 1.5 kg to 2.5 kg of water per kg of fabric; and (b) when the fabric is predominantly polyester, the water content is between 0.5 kg and 2.5 kg of water per kilo of fabric, preferably between 0.8 kg and 2 kg of water per kilo of fabric, most preferably between 1.1 kg and 1.75 kg of water per kg of fabric. The fabric type can be determined by the washing cycle programmed by the automatic washing machine.

Typically, the amount of water contacted to the fabric in (c) to form the intermediate wash bath is in the range of from 5 v/v % to 70 v/v % of the total amount of water calculated in (a) depending on the washing machine type. In a front loader automatic washing machine is in the range of from 25 v/v % to 50 v/v % of the total amount of water calculated in (a) when the water is added directly onto the fabrics or added into the outer tub of the washing machine and then recycled onto the fabrics, or from 40 v/v % to 70 v/v % of the total amount of water calculated in (a) when the water is added into the outer tub. In a top loader automatic washing machine, this amount of water is typically much smaller as the $m_{Water,Int}$ is still calculated using the previous method while the total water can go up to 60-70 liters. Thus, the amount of water is typically in the range of from 5 v/v % to 30 v/v % of the total amount of water calculated in (a) when the water is added directly onto the fabrics or added into the outer tub of the washing machine and then recycled onto the fabrics, or from 10 v/v % to 40 v/v % of the total amount of water calculated in (a) when the water is added into the outer tub.

(d) heating the intermediate wash bath. (d) heats the water that contacts the fabric during (c) with the energy calculated in (b) such that the intermediate wash bath has a temperature $T_{int}$ above the desired final temperature. This is typically given by:

$$T_{int} = \frac{Cp_{water} \cdot m_{water,Total} \cdot (T_{Cycle} - T_{Inlet}) + Cp_{Fabric} \cdot m_{Fabric} \cdot T_{Cycle} + Cp_{water} \cdot m_{water,int} \cdot T_{inlet}}{Cp_{water} \cdot m_{water,int} + Cp_{Fabric} \cdot m_{Fabric}}$$

wherein Tint is the intermediate wash bath temperature and $m_{water, int}$ is the amount of water added during the intermediate wash bath (c).

(e) intermediate washing. (e) washes the fabric in the intermediate wash bath for at least 3 minutes. Typically, no additional water is added during this.

Typically, the intermediate washing (e) is carried out under conditions of agitation.

(f) forming the final wash bath. (f) contacts the remaining amount of water to the intermediate wash bath to form the final wash bath having the desired final temperature.

(g) washing. (g) washes the fabric in the final wash bath for at least 5 minutes.

(h) rinsing. (h) rinsing the fabric.

Intermediate wash bath. Typically, the intermediate wash bath comprises detersive surfactant with a total concentration from 500 ppm to 4000 ppm, more preferably from 1000 ppm to 3000 ppm, amylase enzyme with a concentration from 0.1 ppm to 0.8 ppm, more preferably between 0.2 and 0.6 ppm, protease enzyme with a concentration between 1 ppm and 7 ppm, more preferably with a concentration between 2 and 5 ppm, lipase enzyme with a concentration between 0.2 ppm and 2 ppm, more preferably with a concentration between 0.4 ppm and 1.2 ppm and chelant with a concentration between 15 ppm and 100 ppm, more preferably between 25 ppm and 70 ppm The intermediate wash bath typically comprises all of the detergent ingredients present in the detergent composition. However, the method is also suitable for the sequential dosing of detergent ingredients. In this manner, it is possible to ensure that the intermediate wash bath is free of certain detergent ingredients if desired. One example of this is that the intermediate wash bath can be free of bleach.

Final wash bath. The final wash bath typically comprises all of the detergent ingredients of the detergent composition. The final wash bath may comprise bleach.

Detergent composition. The composition may contain one or more detersive surfactants, typically including but not limited to: anionic surfactants, nonionic surfactants, cationic surfactants, zwitterionic surfactants, amphoteric surfactants, and combinations thereof.

Useful anionic surfactants can themselves be of several different types. For example, water-soluble salts of the higher fatty acids, i.e., "soaps", are useful anionic surfactants. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Additional non-soap anionic surfactants which are suitable for use herein include the water-soluble salts, preferably the alkali metal, and ammonium salts, of organic sulfuric reaction products having in their molecular structure an alkyl group (included in the term "alkyl" is the alkyl portion of acyl groups) containing from about 10 to about 20 carbon atoms and a sulfonic acid or sulfuric acid ester group. Examples of this group of synthetic anionic surfactants include, but are not limited to: a) the sodium, potassium and ammonium alkyl sulfates with either linear or branched carbon chains, especially those obtained by sulfating the higher alcohols ($C_{10}$-$C_{20}$ carbon atoms), such as those produced by reducing the glycerides of tallow or coconut oil; b) the sodium, potassium and ammonium alkylethoxy sulfates with either linear or branched carbon chains, particularly those in which the alkyl group contains from about 10 to about 20, preferably from about 12 to about 18 carbon atoms, and wherein the ethoxylated chain has, in average, a degree of ethoxylation ranging from about 0.1 to about 5, preferably from about 0.3 to about 4, and more preferably from about 0.5 to about 3; c) the sodium and potassium alkyl benzene sulfonates in which the alkyl group contains from about 10 to about 20 carbon atoms in either a linear or a branched carbon chain configuration, preferably a linear carbon chain configuration; d) the sodium, potassium and ammonium alkyl sulphonates in which the alkyl group contains from about 10 to about 20 carbon atoms in either a linear or a branched configuration; e) the sodium, potassium and ammonium alkyl phosphates or phosphonates in which the alkyl group contains from about 10 to about 20 carbon atoms in either a linear or a branched configuration; and f) the sodium, potassium and ammonium alkyl carboxylates in which the alkyl group contains from about 10 to about 20 carbon atoms in either a linear or a branched configuration, and combinations thereof. Especially preferred for the practice of the present invention are surfactant systems containing $C_{10}$-$C_{20}$ linear alkyl benzene sulphonates (LAS) and $C_{10}$-$C_{20}$ linear or branched unalkoxylated alkyl sulfates (AS). Preferred for the practice of the present invention are LAS surfactants, as described hereinabove.

The composition may further comprise one or more $C_{10}$-$C_{20}$ linear or branched alkylalkoxylated sulfates (AAS) having an average degree of ethoxylation ranging from about 0.1 to about 5, preferably from about 0.3 to about 4 and more preferably from about 0.5 to about 3. Such AES surfactants can be present therein at an amount ranging from about 0 ppm to about 1000 ppm, preferably from about 0 ppm to about 500 ppm, more preferably from about 0 ppm to about 300 ppm of the final wash bath.

Further, the composition may comprise nonionic surfactant. Preferred nonionic surfactants are those of the formula $R^1(OC_2H_4)$—OH, wherein $R_1$ is a $C_{10}$-$C_{20}$ alkyl group or alkyl phenyl group, and n is from about 1 to about 80. Particularly preferred are $C_{10}$-$C_{20}$ alkylalkoxylated alcohols (AA) having an average degree of alkoxylation from 1 to 20.

Other surfactants useful herein include amphoteric surfactants and cationic surfactants. Such surfactants are well known for use in laundry detergents.

The composition may also contain one or more adjunct ingredients commonly used for formulating laundry detergent compositions, such as detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photo-bleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds suppressors; and any combination thereof.

Test Methods

Stain removal measurement. The extent of stain removal performance achieved by any wash cycle is calculated as the color difference in the L a b color space between the stain and the textile's background before and after wash. The initial color difference is defined as initial noticeability ($IN_i$, Equation 1), whereas the final noticeability ($FN_i$, Equation 2) refers to the color difference between the stains after the wash and the textiles initial background. The Stain Removal Index ($SRI_i$) for a given stain i is calculated as described by Equation 3.

$$IN_i = \sqrt{(L_{s_{io}} - L_{b_o})^2 + (a_{s_{io}} - a_{b_o})^2 + (b_{s_{io}} - b_{b_o})^2} \quad \text{Equation 1}$$

$$FN_i = \sqrt{(L_{s_{if}} - L_{b_o})^2 + (a_{s_{if}} - a_{b_o})^2 + (b_{s_{if}} - b_{b_o})^2} \quad \text{Equation 2}$$

$$SRI_i(\%) = \frac{IN_i - FN_i}{IN_i} \cdot 100 \quad \text{Equation 3}$$

wherein the sub-indexes s, b, f and o refer to stain, fabric background, final and initial values respectively.

Method to measure fabric water absorbency. The fabric water absorbency refers to the maximum amount of water retained per mass of dry fabric. To measure the fabric water absorbency of a specific fabric type, below are the required steps:
  (i) select three items of the same fabric type at least 20 g in mass;
  (ii) weigh each dry fabric to determine their dry mass ($m_{dry}$);
  (iii) immerse the fabrics in a bucket of water so that there is considerably more water than that absorbed by the fabrics. Take each fabric out, extended and let it drip for 20 seconds;
  (iv) weigh the wet fabric ($m_{wet}$) and calculate the mass of water per mass of dry fabric as:

$$\text{Absorbency} = \frac{m_{wet} - m_{dry}}{m_{dry}}$$

EXAMPLES

Example 1: Comparative Stain Removal Performance of Fabric Treatment Process for a Washing Cycle with Intermediate Wash Bath and a Final Wash Bath All experiments are conducted in a mid-scale high throughput equipment that runs on a Peerless System platform. It consists of 10 vessels of 1 L capacity with a three-blade post agitator similar to the one used by Ganguli and Eenderbug (1980), which operate in parallel. The equipment is automatized so that filling, washing, draining and rinsing of the vessels is automatically conducted by the system.

Cleaning of the vessels is conducted prior to start the wash process by adding 0.25 L of city water at 30° C. to each of the vessels of the equipment. The water remained in the vessels for 2 minutes under a constant agitation of 1800 deg./s. After draining the water used for the cleaning stage the equipment is ready to use. All experiments were conducted with 60 g of total ballast load comprising 50 g of knitted cotton swatches (5 cm×5 cm) and the test items containing the stains to be analyzed (10 g of 7 cm×7 cm knitted cotton swatches). The water absorbency of the ballast load used is 3 kg water/kg dry fabric. Table 2 describes the detergent formulation used for the reference and comparative wash processes.

In the reference wash process (Experiment A), after draining the water used for the cleaning stage, 0.4 L of city water at the target washing temperature (30° C.) is added to the vessel. Next, the required dosage of detergent formulation (2.38 g) pre-dissolved in the necessary volume of city water at the target temperature (30° C.) to reach 1 L of total wash solution is added to the vessel and mix for 1 minute under a constant agitation of 300 rpm. Afterwards, the ballast load comprising the knitted cotton swatches and the test items, are added to the vessel prior to start the wash process. The main wash is conducted for 30 minutes under a constant agitation of 300 rpm followed by a 15 minute 30° C. rinse.

In the other wash processes (experiments B-C), the required dosage of the liquid detergent formulation (2.38 g) is pre-dissolved in the necessary volume of city water at the target temperature described in Table 1 for the intermediate wash bath to achieve the same detergent concentration that would be obtained in a Front Loading Washing Machine (FLWM) when considering a water volume equal to a 70% of the total water absorbency of the ballast load considering a ballast load of 3 kg with a water absorbency of 3 kg of water/kg dry fabric (6.3 kg total water).

After dissolving the detergent formulation, a portion of the solution corresponding to a volume equal to 70% of the water absorbency of the ballast load used for experiments (60 g with 3 kg water/kg dry fabric absorbency), resulting in a total of 0.126 kg of water is added to the vessels. Afterwards, the ballast load comprising the knitted cotton swatches and the test items are added to the vessels. The detergent solution remains in contact with the ballast for 5 minutes at the target temperature of the intermediate wash bath and under a constant agitation as described in Table 1. At this moment, the remaining detergent solution previously prepared is also added to the vessels in addition to the extra volume of city water at the target temperature for the main wash (see Table 1) required to reach 1 L of total wash solution in each vessel. At this moment the main wash is started. In all cases, the main wash is conducted for 30 minutes under a constant agitation of 300 rpm followed by a 15 minute 30° C. rinse.

TABLE 1

| Experiment | Description |
| --- | --- |
| A (Reference) | No intermediate bath, main wash is conducted at 30° C. under a constant agitation of 300 rpm. |
| B (comparative) | Intermediate wash bath is conducted at 30° C. under a constant agitation of 300 rpm. Main wash is conducted at 30° C. under a constant agitation of 300 rpm. |
| C (inventive) | Intermediate wash bath is conducted at 45° C. under a constant agitation of 300 rpm. Main wash is conducted at 30° C. under a constant agitation of 300 rpm. |

After the washing cycle is finished, the ballast load and the stains are removed from the vessels and introduced in individual drying bags in all cases (reference and comparative wash processes). Afterwards, the textiles are dried for 30 minutes at low temperature in an Electrolux T3290 gas dryer. The extent of stain removal is calculated as the color difference between the stain and the textile's background before and after wash as described by Equation 1-Equation 3.

Table 3 shows the stain removal performance obtained for each of the experiments. The Stain Removal Index (SRI) is calculated via image analysis under D65 standard illuminant conditions. The results presented are the average of the 2 internal repeats for each experimental condition and 4 external repeats.

TABLE 2

| Group | Component | TTW (ppm) |
|---|---|---|
| Surfactants | Sodium dodecyl benzenesulfonate (LAS) | 357 |
| | C14-15 AA with 7 EO | 202 |
| | C12-14 AES with 3 EO (70%) | 220 |
| | Lauramine oxide | 19 |
| Builders/ Chelant | Fatty Acids | 121 |
| | Citric Acid | 156 |
| | Diethylene triamine penta(methyl phosphonic acid) (DTPMP) | 18 |
| | Hydroxyethylidene diphosphonic acid (HEDP) | 25 |
| Performance actives/ preservatives | Polymer Lutensit Z96 | 25 |
| | Polyethylene glycol (PEG)-co-polyvinyl acetate (PvAc) | 51 |
| | Preservatives | 0.1 |
| | Na Formate (40% solution) | 52 |
| Solvent/ neutralizer/ structurant | Ethanol | 19 |
| | 1,2 Propylene glycol | 190 |
| | NaOH | 204 |
| | MEA hydrogenated castor oil | 15 |

TABLE 3

| Stain Name | A (Reference) | ΔB (Comparative) | ΔC (Inventive) |
|---|---|---|---|
| ASTM Sebum PCS94 | 44.28 | 7.14 | 8.40 |
| Chocolate Soy Milk CS45 | 28.56 | 3.50 | 3.70 |
| Dyed Bacon Grease GSRTDBG001 | 66.51 | 0.59 | 6.95 |
| Cooked Beef GSRTCBE001 | 63.60 | 0.69 | 1.17 |
| BBQ EQ008 | 67.07 | 1.87 | 3.68 |
| Gravy EQ066 | 77.50 | 0.35 | 2.11 |
| Make Up GSRTCG0001 | 57.19 | 5.20 | 8.66 |
| Red wine GSRTRW001 | 69.26 | 3.03 | 4.60 |
| Espresso Coffee EQ195 | 66.22 | 6.69 | 6.87 |

Table 3 shows that, while comparative wash processes B present improved stain removal for some stains (i.e. ASTM sebum, red wine, espresso coffee), experiment C presents the best performance across all stains. It can be observed that the stains presenting benefits belong to the beverage category (e.g. red wine and coffee), enzymatic (e.g. chocolate soy milk, BBQ and gravy) and grease stains (e.g. ASTM sebum, dyed bacon grease and cooked beef).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of laundering fabrics comprising:
   (a) calculating a final amount of water to be added to a final wash bath;
   (b) calculating the amount of energy needed to heat this final amount of water to a desired final temperature;
   (c) contacting an amount of water that is less than the final amount of water with fabric to form an intermediate wash bath, wherein a detergent composition is contacted to the fabric during the formation of the intermediate wash bath, or prior to the formation of the intermediate wash bath;
   (d) heating the water that contacts the fabric during (c) with the amount of energy calculated in (b) such that the intermediate wash bath has a temperature above the desired final temperature;
   (e) washing the fabric in the intermediate wash bath for at least about 3 minutes;
   (f) contacting an additional amount of water to the intermediate wash bath to form the final wash bath having the final amount of water and the desired final temperature;
   (g) washing the fabric in the final wash bath for at least about 5 minutes; and
   (h) rinsing the fabric.

2. A method according to claim 1, wherein during (a), the weight of fabric to be laundered during the method is determined, and this fabric weight is used when calculating the final amount of water to be added to the final wash bath.

3. A method according to claim 1, wherein the amount of water contacted to the fabric in (c) to form the intermediate wash liquor is an amount of water that provides a water content of from about 1.1 kg to about 3.5 kg of water per kg of fabric.

4. A method according to claim 1, wherein the type of fabric to be laundered during the method is determined, and this fabric type is used when determining the amount of water to be contacted to the fabric in (c) to form the intermediate wash such that:
   (a) when the fabric type is predominantly cotton, the water content is from about 1.5 kg to about 3.5 kg of water per kg of fabric; and
   (b) when the fabric is predominantly polyester, the water content is from about 1.1 kg to about 1.75 kg of water per kg of fabric.

5. A method according to claim 1, wherein the amount of water contacted to the fabric in (c) to form the intermediate wash bath is in the range of from 5 v/v % to 70 v/v % of the total amount of water calculated in (a).

6. A method according to claim 1, wherein the amount of water that is less than the final amount of water contacted to the fabric in (c) to form the intermediate wash bath is:
   (a) in the range of from 25 v/v % to 70 v/v % of the total amount of water calculated in (a), and wherein the process is carried out in a front-loader automatic washing machine; or (b) in the range of from 5 v/v % to 40 v/v % of the total amount of water calculated in (a), and wherein the process is carried out in a top-loader automatic washing machine.

7. A method according to claim 1, wherein a ratio of the washing time of (e) to the time of washing time of (g) is in the range of from about 1:2 to about 1:20.

8. A method according to claim 1, wherein the washing in (e) is carried out under conditions of agitation.

9. A method according to claim 1, wherein the desired final temperature is about 30° C., or less than about 30° C., and the temperature of the intermediate wash bath is above about 37° C.

10. A method according to claim 1, wherein the intermediate wash bath comprises detersive surfactant, enzyme and chelant.

11. A method according to claim 1, wherein bleach is contacted to fabric after (e), such that the intermediate wash bath is free of bleach but the final wash bath comprises bleach.

12. A method according to claim 1, wherein the concentration of detergent chemistry present in the intermediate wash bath is higher than the concentration of detergent chemistry present in the final wash bath.

13. A method according to claim 1, wherein the method is carried out in an automatic washing machine.

14. A method according to claim 1, wherein the water can be heated in the sump of an automatic washing machine, in the water inlet of an automatic washing machine, or externally to the automatic washing machine.

* * * * *